Oct. 23, 1956 H. M. OLSON 2,768,041
COMBINATION OIL RING AND PISTON GUIDE
Filed Dec. 14, 1953
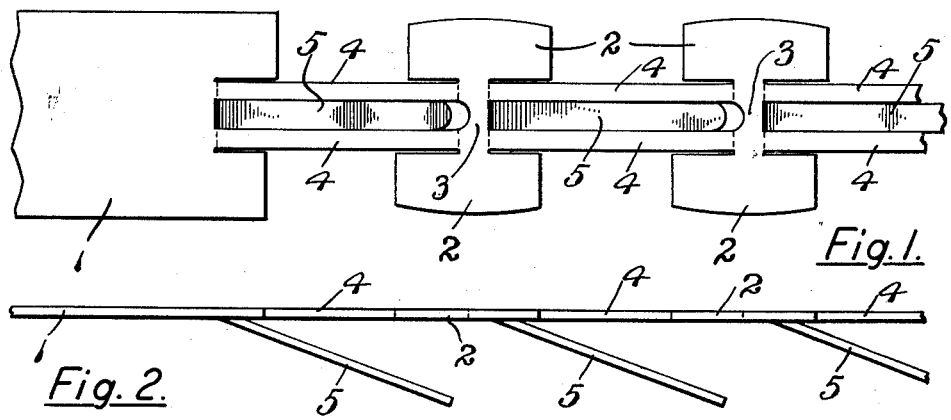
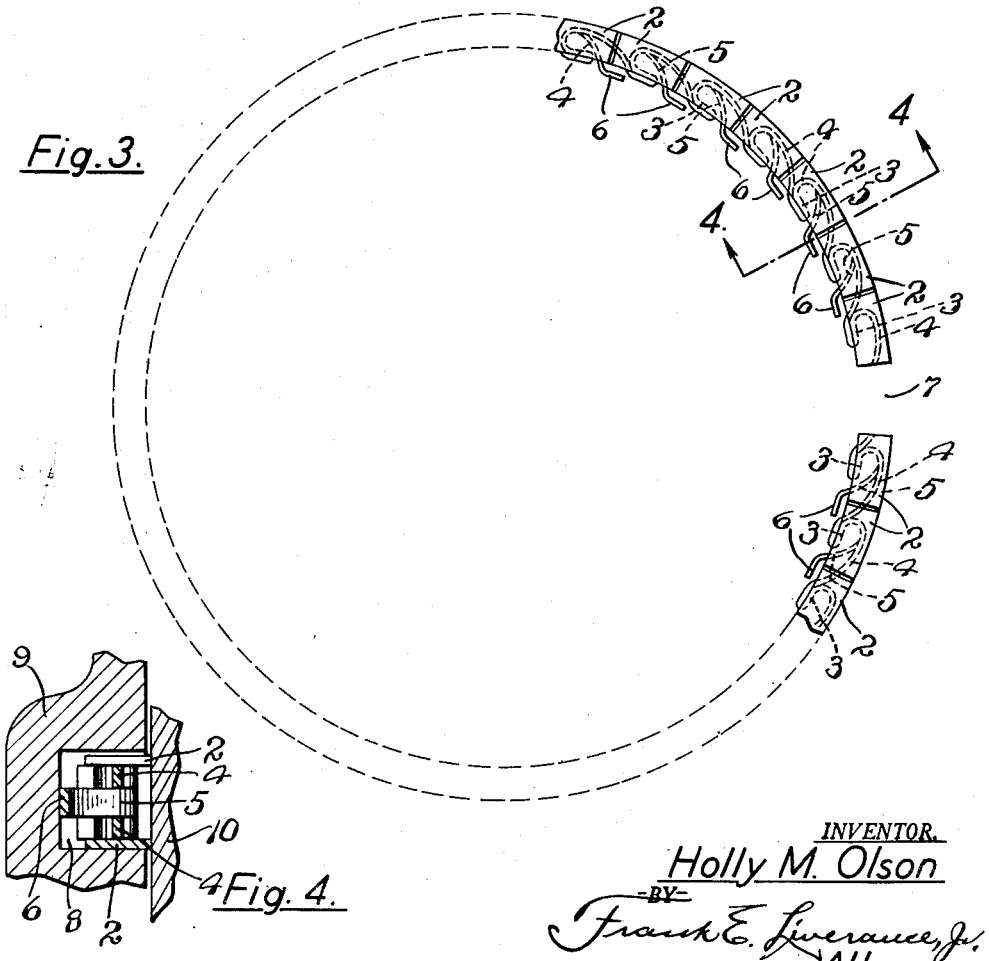
INVENTOR.
Holly M. Olson
BY
Frank E. Liverance, Jr.
Attorney United States Patent Office 2,768,041
Patented Oct. 23, 1956

2,768,041

COMBINATION OIL RING AND PISTON GUIDE

Holly M. Olson, Muskegon, Mich., assignor to Sealed Power Corporation, Muskegon, Mich., a corporation of Michigan Application December 14, 1953, Serial No. 398,083

3 Claims. (Cl. 309—44)

The present invention is directed to a novel and effective means for dampening and retarding side to side or tilting movement of a piston in an internal combustion engine during its operating cycles, which in practice is embodied as a unit with a circumferentially compressible oil control piston ring. Such combined unit oil ring and piston guide is one which is economically produced, particularly satisfactory in operation and serves to eliminate or greatly cut down side to side or tilting movement which, when it occurs, interrupts or breaks the ring seal against the cylinder of an internal combustion engine in which the piston is reciprocated, whereby a passage of oil above the piston ring to an undesirable extent in many cases develops making what is known as an "oil pumper."

It is apparent that a piston which is the piston ring carrier in an internal combustion engine is subjected to more variable forces during operation than any other part of the engine. The movements of the piston in operation and the forces developed come from the very high speed of the piston, its complete stopping at each end of its travel, the high compression of the fuel charge, the increased pressure of such charge when ignited or exploded, high temperatures and the expansion effects thereof, varying pressure loads on the wrist pin of the piston and the continually varying angles of the connecting rod to the longitudinal axis of the piston, both thrust and tilting forces alternating from side to side between the opposite surfaces of the cylinder bore against which piston rings bear.

Further, the increased production of the types of engines known as V–8 and other V-engines has required a reduction in connecting rod length and also in piston length in relation to the cylinder bore diameter. Such lesser dimensions contribute to and enhance greater side to side movement and greater tilting action of the piston because of its shorter length in its movement under varying load and temperature conditions. As before stated, such tilting movements or any other movements of a piston outside of or away from a constant true alignment thereof in the cylinder will tend to effect breaks of the sealing action of the piston ring against the cylinder, with consequent excess use of oil which not only increases the expense of engine operation from cost of the extra oil consumed but further may result in a smoky exhaust, carbon collection and other unwanted and damaging effects.

I have heretofore invented a novel piston ring structure in the type of piston ring known as circumferentially compressible, and have obtained Patent thereon, No. 2,650,143, granted August 25, 1953. The piston ring of this invention lends itself in an exceptional manner to the incorporation of novel structure to accomplish dampening and retarding of the piston from side to side or tilting movement. Moreover, with such piston ring of the above mentioned patent, the added very desirable feature of eliminating piston tilt away from its true alignment is one which is integrally incorporated with the piston ring without additional cost over what the piston ring itself will cost. It eliminates the use of the much used corrugated ribbon expander spring located back of the piston ring in a ring receiving groove of a piston, and the disadvantages which such type of expander spring has, in properly manufacturing and assembling with the piston ring and which, in its performance, is weak and far from satisfactory in connection with an oil controlled ring.

With the present invention there is provided in a one-piece structure both an oil compression ring and a piston guide. The piston ring has the feature of expanding pressure against the cylinder bore and flexibility to conform to irregularities thereof while, at the inner side of the ring, guide pressure members are provided, in large numbers one to each set of the very large number of sectors or segments of the circumferentially compressible piston ring to engage against the bottom of the piston ring groove as a means for holding and guiding the piston. Also such pressure members add to the outward expansion tendency of the piston ring over and above that produced by circumferential compression thereof, while dampening and retarding undesirable side to side action of the piston.

An understanding of the invention may be had from the following description taken in connection with the accompanying drawing, in which, Fig. 1 is an enlarged fragmentary plan showing the thin ribbon stock in its first step of production to eventually obtain the combined oil ring and piston guide, being made from continuous thin ribbon stock, preferably of steel, and of suitable gauge thickness.

Fig. 2 is a side elevation thereof.

Fig. 3 is a plan view of the completed ring parted at one side as shown, the ring being of substantially circular form as indicated in the dash outline thereof, and Fig. 4 is an enlarged vertical section through a fragmentary portion of a piston at a ring groove therein within an internal combustion engine cylinder, the ring structure of my invention being shown in transverse section within said groove, such section being taken substantially on the plane of line 4—4 of Fig. 3.

Like reference characters refer to like parts in the different figures of the drawing.

From an elongated or ribbon strip of sheet metal which is preferably steel, indicated at 1 in Figs. 1 and 2, and having proper width and thickness, the sectors or lands 2 of the ring segments are cut, one at each side of the strip and spaced in pairs from each other lengthwise of the strip, each pair being integrally connected by a cross-piece 3 substantially midway between the ends of such lands 2 and much narrower than the length thereof as shown. Such connecting parts 3 between the lands of each pair are connected in succession by two spaced, narrow, elongated sections or portions 4. Such spacing of the parts 4 of each pair thereof is provided by striking an elongated tongue 5 between them. The tongues have integral connection at one end to one of the cross segment connectors 3 and extend therefrom toward the next succeeding connector 3. When passed through a punch press to obtain the structure shown in Figs. 1 and 2 they are stamped to lie substantially parallel to each other at an angle to the strip from which made, as in Fig. 2.

The formation of the circumferentially compressible piston ring and the manner in which it is formed is identical with that shown in my Patent No. 2,650,143. The spaced parallel elongated connectors 4 located lengthwise of the piston ring are formed into loops the lands at 2 being brought closely together. The loops are of the form shown in Fig. 3 serving as supports for the lands 2. With my invention the tongues 5 are bent and formed for a portion of their length into arcuate form and terminate in bearing feet 6, one at the free end portion of each of the tongues. Said bearing feet 6 are inwardly of the inner edges of the cylinder wall bearing lands 2. The piston ring is of circular form and is parted at one side as at 7 in Fig. 3.

When installed in a ring receiving groove 8 of a piston 9 (Fig. 4) the parting at 7 is closed, the ends of the ring abutting each other. In its free form the ring when closed at its parting has an exterior diameter in excess of the interior diameter of the cylinder bore in which located. The ring must be circumferentially compressed and shortened in circumferential length. This results in the creation of an expanding force in the piston ring which causes the outer edges of the bearing lands 2 to bear with a desired unit pressure against the cylinder wall bore. The terminal foot sections 6 of the tongues 5 bear against the bottom of the piston ring groove 8 as in Fig. 4. Such tongues 5 also of yielding spring material will be strained out of normal free form and will have forces generated therein which additionally tend to move the piston ring outwardly and cause such lands to bear with increasing pressure against the cylinder bore.

The foot sections 6 of the tongues 5 bear with pressure force against the bottom of the piston ring groove and tend to remain flat thereagainst resisting tilting action of the piston ring and through such piston ring maintaining the piston against tilting from proper alignment. Such pressure members consisting of the tongues 5 with the terminal feet 6 thereof struck or sheared from the connectors 4 between the segment pairs is formed to rest with predetermined pressure on the bottom of the ring groove. There is a multiplicity of them engaging the bottom of the ring groove at short spaced distances from each other, one for each pair of segments or lands 2. The openings left from shearing out the tongues 5 provides adequate ventilation for the flow of oil.

The piston being the ring carrier carries its rings mounted thereon with it in its reciprocating movements, and friction from pressure engagement between a piston ring and the sides of the ring grooves occurs which at times may be greater than the outward pressure of the piston ring against the cylinder bore. The contribution to outward expanding pressure of the piston ring by reason of the spring tongues 5 and their bearing feet 6 advantageously helps in overcoming such groove friction.

The piston ring as described embodying my invention is economically produced, easily installed and may be made in any of the sizes required for both a circumferentially compressible oil ring and the combined combination oil ring and piston guide herein disclosed. Merely severing completely the tongues 5 at both leaves a vented circumferentially compressible oil ring like in Patent 2,650,143. They are economically and expeditiously formed as disclosed to obtain the desirable results and functions which have been stated.

The invention is defined in the appended claims and is to be considered comprehensive of all forms of structure coming within their scope.

I claim:

1. In a parted, circumferentially compressible, flexible piston ring, having ends at its parting adapted to be abutted against each other, and adapted to be reduced by contraction to a smaller circumferential length, the improvement comprising, a plurality of yielding spring members connected to said piston ring at one end of each of said members, and located around the ring in spaced relationship to each other, and a tongue struck from each of said members, integrally connected therewith at one end, having free ends located inwardly of the ring and adapted to be pressed against the bottom of a piston ring groove in which installed.

2. In a parted, circumferentially compressible, flexible piston ring of thin spring material, said ring having a successive series of pairs of spaced bearing lands connected at their inner edges by integral connectors, one for each pair, and yielding spring means integral with said connectors, connecting them in succession, the improvement comprising, tongues integrally connected, one at one end to each of said connectors and curving away therefrom and thence to within the ring, each at its free end adapted to bear against the bottom of a piston ring groove in which installed.

3. In a parted, circumferentially compressible piston ring, the improvement comprising, a plurality of spaced yielding spring members integral with and around said ring connected at both ends of said spring members with the ring and curving outwardly from said end points of connection and a spring tongue associated with each spring member connected at one end with the ring and having a free end terminating in a foot portion located inwardly of the ring and adapted to bear against the bottom of a piston ring groove in which installed.

References Cited in the file of this patent

UNITED STATES PATENTS

| | | |
|---|---|---|
| 2,231,801 | Cords | Feb. 11, 1941 |
| 2,334,273 | Mason | Nov. 16, 1943 |
| 2,650,143 | Olson | Aug. 25, 1953 |